United States Patent [19]
Schlueter Jr. et al.

[11] Patent Number: 5,670,230
[45] Date of Patent: Sep. 23, 1997

[54] ENDLESS SEAMED BELT WITH HIGH STRENGTH

[75] Inventors: Edward L. Schlueter Jr.; Thomas C. Parker, both of Rochester, N.Y.

[73] Assignee: Xerox Corporation, Stamford, Conn.

[21] Appl. No.: 320,805

[22] Filed: Oct. 11, 1994

[51] Int. Cl.⁶ ............................................ B32B 3/00
[52] U.S. Cl. .................. 428/57; 474/253; 474/254; 428/193; 198/844.2
[58] Field of Search .................... 474/253, 254, 474/256, 260, 261, 263; 428/192, 193, 194, 200, 198, 225, 245, 243, 57; 198/844.2

[56] References Cited

U.S. PATENT DOCUMENTS

| | | | |
|---|---|---|---|
| 2,461,859 | 2/1949 | Vasselli | 24/38 |
| 3,729,873 | 5/1973 | Sandell | 51/399 |
| 3,988,940 | 11/1976 | Szonn et al. | 474/254 |
| 4,265,990 | 5/1981 | Stolka et al. | 430/59 |
| 4,279,676 | 7/1981 | Morrison et al. | 474/352 |
| 4,564,542 | 1/1986 | Worcester | 428/58 |
| 4,574,435 | 3/1986 | Luciano et al. | 24/33 |
| 4,596,540 | 6/1986 | F'Geppert | 474/254 |
| 4,752,282 | 6/1988 | Habegger | 474/263 |
| 4,753,628 | 6/1988 | Gore | 474/112 |
| 4,903,824 | 2/1990 | Takahashi | 198/853 |
| 4,983,146 | 1/1991 | Charles et al. | 474/117 |
| 5,007,523 | 4/1991 | Morefield | 198/497 |
| 5,128,091 | 7/1992 | Agur et al. | 264/512 |
| 5,170,968 | 12/1992 | Helmner | 198/496 |
| 5,190,608 | 3/1993 | Darcy et al. | 156/73.4 |
| 5,303,725 | 4/1994 | Yu et al. | 430/56 |
| 5,305,560 | 4/1994 | Roelofs | 51/399 |
| 5,400,899 | 3/1995 | Tingskog | 198/819 |
| 5,421,450 | 6/1995 | Kitagawa et al. | 198/847 |
| 5,487,707 | 1/1996 | Sharf et al. | |
| 5,514,436 | 5/1996 | Schlueter et al. | 428/57 |
| 5,549,193 | 8/1996 | Schlueter, Jr. et al. | |

*Primary Examiner*—Patrick Ryan
*Assistant Examiner*—J. M. Gray
*Attorney, Agent, or Firm*—Zosan S. Soong; Sam Mott; Annette L. Blade

[57] ABSTRACT

An endless flexible seamed belt formed by joining two ends of the material from which the belt is fabricated, the belt having at least one overlapping butting joint to form the endless belt; each end of the belt material having top and bottom overlapping mating portions of the same length and wherein both the top and bottom overlapping portions are about one-half the thickness of the belt material, the mating portions being joined to provide a lapping joint and two butting joints and wherein rigid high strength fibers are present between mating portions of at least one joint, the seamed belt having been formed by the application of heat to said mating portions when the fibers are present in at least one joint.

14 Claims, 2 Drawing Sheets

ENDLESS SEAMED BELT WITH HIGH STRENGTH

CROSS REFERENCE TO RELATED APPLICATIONS

Attention is hereby directed to copending U.S. patent application Ser. No. 08/297,198 (D/93563) entitled "Puzzle Cut Seamed Belt With Strength Enhancing Strip" in the name of Thomas C. Parker et al.; copending U.S. patent application Ser. No. 08/297,203 (D94227) entitled "Puzzle Cut Seamed Belt With Bonding Between Adjacent Surfaces" in the name of Edward L. Schlueter Jr., et al.; copending U.S. Pat. No. 5,487,707 (D/94225) entitled "Endless Belt With UV Cured Puzzle Cut Seam" in the name of Lawrence J. Lynd et al.; copending U.S. Pat. No. 5,514,436 (D/94226) entitled "Endless Puzzle Cut Seamed Belt", in the name of Edward L. Schlueter Jr., et al., and copending U.S. Pat. No. 5,549,193 (D/94226Q) entitled "Endless Seamed Belt With Low Thickness Differential Between The Seam and The Rest of The Belt" in the name of Edward L. Schlueter Jr., et al. all commonly assigned to the assignee of the present invention and filed concurrently herewith.

BACKGROUND OF THE INVENTION

The present invention is directed to an endless flexible seamed belt having improved seam quality and smoothness with substantially no thickness differential between the seamed portion of the belt and the adjacent portions of the belt. The seam is formed by overlapping and butting one half thickness belt end portions.

Perhaps, the most important invention that may have ever been made was that of the wheel. Arguably, one of the follow-on inventions of almost equal importance was directed to a belt. Initially, the belts were fabricated by taking two ends of a web material and fastening them together by a variety of techniques such as sewing, wiring, stapling, suitable for many applications, such as the delivery of rotary motion from a source such as a motor, to implement a device such as a saw blade, they are not as satisfactory in many of the more sophisticated applications of belt technology in common practice today. In the technology of the current day many applications of belts require much more sophisticated qualities and utilities and in particular for such special applications as in electrostatographic and electrographic imaging apparatus and processes for use as photoreceptors, intermediate sheet and/or image transport devices, fusing members or transfix devices, it is ideal to provide a seamless belt whereby there is no seam in the belt which mechanically interferes with any operation that the belt performs or any operation that may be performed on the belt. While this is ideal the manufacture of seamless belts requires rather sophisticated manufacturing processes which are expensive and are particularly more sophisticated, difficult and much more expensive for the larger belts. As a result, various attempts have been made to provide seamed belts which can be used in these processes. Previous attempts to manufacture seamed belts have largely relied on belts where the two ends of the belt material have been lapped or overlapped to form the seam or have butted against one another and then fastened mechanically by heat or other means of adhesion such as by the use of an adhesive or ultrasonic welding.

The belts formed according to the typical butting technique while satisfactory for many purposes are limited in bonding, strength and flexibility because of the limited contact area formed by merely butting or overlapping the two ends of the belt material. Furthermore, belts formed according to the butting or overlapping technique provide a bump or other discontinuity in the belt surface leading to a height differential between adjacent portions of the belt of 0.010 inches or more depending on the belt thickness, which leads to performance failure in many applications. For example, one of the most severe problems involves cleaning the imaging belt of residual toner after transfer of the toner image. Intimate contact between the belt and cleaning blade is required. With a bump, crack or other discontinuity in the belt the tuck of the blade is disturbed which allows toner to pass under the blade and not be cleaned. Furthermore, seams having differential heights may when subjected to repeated striking by cleaning blades cause the untransferred, residual toner to be trapped in the irregular surface of the seam. Photoreceptors which are repeatedly subjected to this striking action tend to delaminate at the seam when the seam is subjected to constant battering by the cleaning blade. As a result, both the cleaning life of the blade and the overall life of the photoreceptor can be greatly diminished as well as degrading the copy quality. In addition, such irregularities in seam height provide vibrational noise in xerographic development which disturbs the toner image on the belt and degrades resolution and transfer of the toner image to the final copy sheet. This is particularly prevalent in those applications requiring the application of multiple color layers of liquid or dry developer on a photoreceptor belt, which are subsequently transferred to a final copy sheet.

In these sophisticated applications, it is desired to provide a seam height differential between the seam and the unseamed adjacent portions less than 0.001 inch. In addition, the presence of the discontinuity in belt thickness reduces the tensile strength of the belt which for prolonged use is desirably 80–90% that of the parent material unseamed. Furthermore, it is desired that the seamed belt have seam mechanical bonding strength and flexibility capable of satisfactory performance for an extended period of time. In addition, the discontinuity or bump in such a belt may result in inaccurate image registration during development, inaccurate belt tracking and overall deterioration of motion quality, as a result of the translating vibrations.

In addition to the above-discussed difficulties associated with discontinuities between the seam and adjacent portions of the belt other difficulties arise with respect to some of the modern day materials with which the belts are made. For example, many belts are made of thermoplastic sheets which are formed or extruded into sheet form. During the extrusion process mechanical and thermal stresses are built into the extruded sheet. When subsequently used to form a belt, and in particular, during the process of seaming the belt, heat is applied, for example, with ultrasonic or impulse heaters or welders. During this heating the thermal and mechanical stresses are relieved and a puckering or rippling in the seam area is formed which during operation of the belt in a copying machine, for example, leads to a copy quality defect such as a print deletion or incomplete transfer. Indeed, all subsystems in an electrostatographic printing machine that would come in contact with the belt would present potential problems. In addition, when the thermoplastic material is mechanically cut and additional stresses are introduced in the seam area in the belt which on heating are also released again leading to a similar copy quality defect.

SUMMARY OF THE INVENTION

Accordingly, it is a principle object of the present invention to provide a seamed belt with substantially no thickness differential between the seam and the adjacent portions of the belt.

In accordance with a principle aspect of the present invention the belt is made by joining two ends of the material from which the belt is fabricated, each end being one half of the thickness of the belt material having an overlapping, and butting joint to form an endless belt.

In a further principle aspect of the present invention each end of the belt material has top and bottom overlapping mating portions of the same length and wherein both top and bottom overlapping portions are about one-half the thickness of the belt material with the mating portions being joined to provide a lapping joint and two butting joints and wherein rigid high strength fibers are present between mating portions of at least one joint, the belt seam having been formed by the application of heat to the mating portion when the fibers are present in at least one joint.

In a further aspect of the present invention the fibers are present between the two mating portions forming the lapping joint and the top and bottom overlapping portions extends across the width of the belt.

In a further aspect of the present invention the fibers are graphite fibers.

In a further aspect of the present invention the seam and adjacent belt surfaces are smooth and free of rippling.

In a further aspect of the present invention the rigid high strength fibers are oriented parallel to the belt seam.

In a further aspect of the present invention the belt material in the seam and the fibers are under tension when the heat is applied to the seam.

In a further aspect of the present invention the belt material is melted around the fibers.

In a further aspect of the present invention the belt material is a thermoplastic or thermosetting material and preferably is a thermoplastic polycarbonate.

DESCRIPTION OF PREFERRED EMBODIMENT

Figure 1:
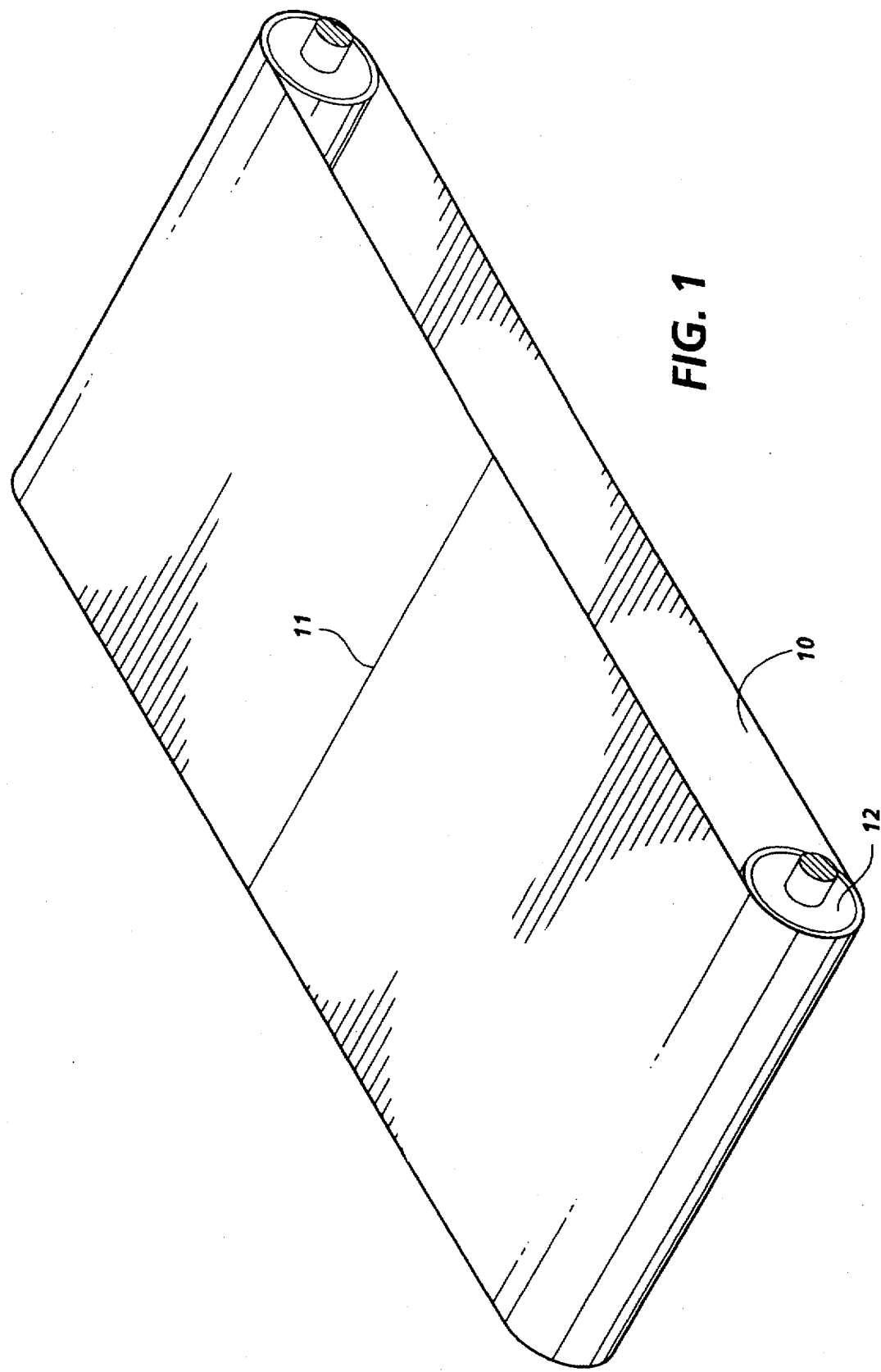
FIG. 1 is an isometric representation of the flexible seamed belt formed according to the present invention providing at least one overlapping, butting, interlocking joint to form the endless belt. While the seam 11 is illustrated as being perpendicular to the two parallel sides of the belt, it will be understood that it may be angled or slanted with respect to the parallel sides of the belt.

With continued reference to the figures and additional reference to the following description, the invention will be described in greater detail. A seam formed according to the present invention is one of enhanced strength, flexibility and mechanical life and has substantially no height differential between the seamed portion and the unseamed portions adjacent to the seamed portion, it has application for a variety of industrial purposes. FIG. 1 is illustrative of belt 10 having a seam 11, the belt being driven around rollers 12.

The endless flexible seamed belt may be made of any suitable material. Typical materials include, photoreceptor materials which may be multilayered such as those described in U.S. Pat. No. 4,265,990, as well as a variety of thermoplastic and thermosetting belt materials. Any suitable belt material may be employed. Typical materials include polyesters, polyurethanes, polyimides, polyvinyl chloride, polycarbonates, acrylics, polyolefins such as polyethylene and polypropylene and polyamides such as nylon. In addition, elastomeric materials such as silicones, fluoroelastomers such as those particularly from the class of copolymers and terpolymers of vinylidenefluoride hexafluoropropylene and tetrafluoroethylene, and known commercially under the trademark VITON®, (E. I. DuPont™), EPDM and nitriles etc. For certain purposes metallic cloth and even paper may be used. The belt material is selected according to its intended use to have the appropriate physical characteristics such as tensile strength, Young's modulus, electroconductivity, thermal conductivity and stability, flex strength and in certain applications, such as transfix, being capable of being subjected to high temperatures. Other important characteristics of the belt material include surface energy desired low for good toner release, for example, gloss, dielectric constant and strength.

Figure 2:
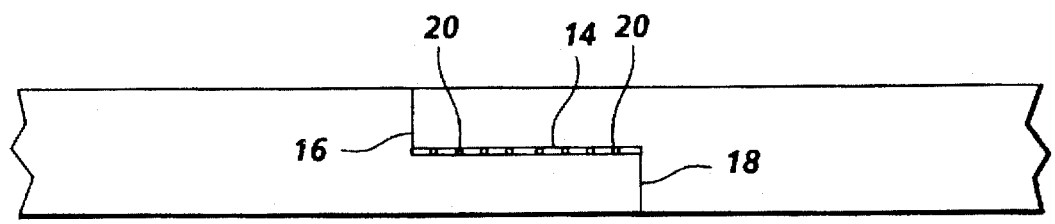
FIG. 2 is an enlarged cross-sectional view of an embodiment of the overlapping 14 and butting joint used to form the endless belt according to the present invention. The X marks a preferred location for the placement of the fibers.

The pattern of the overlapping and butting joint may be formed in any suitable manner such as by milling, cutting with a blade or knife or by more sophisticated techniques including die cutting or laser cutting with commercially available lasers such as a $CO_2$ laser or excimer laser generating a beam of sufficient width and intensity that within an acceptable time will provide the desired cut. Following cutting, it can be deburred and cleaned by air, ultrasonics or brushing if necessary. The overlapping and butting joint may take any suitable form as long as each end of the belt material have a top and bottom overlapping mating portions of the same length and are about one-half the thickness of the belt material. The mating portions are joined to provide only an overlapping joint 14 and/or one or two butting joints 16 and 18 which extend across the width of the belt. As illustrated in FIG. 2 such a geometry provides a seamed belt with substantially no thickness differential between the seam and the adjacent portions of the belt.

Any suitable fiber 20 may be used that has a high strength, a Young's modulus substantially greater than the belt material and which will withstand the processing temperature and other conditions of use. Typical materials include graphite, glass and nylon.

Figure 3:
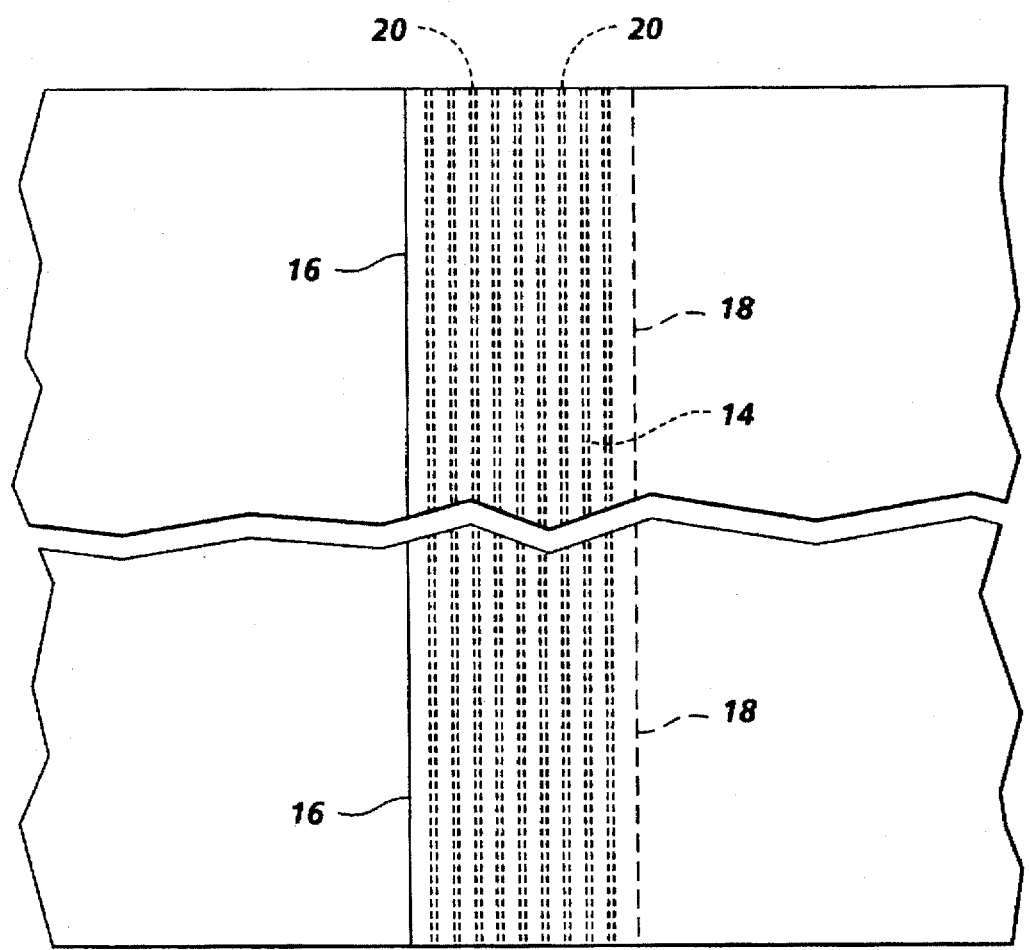
FIG. 3 is a further enlarged top view of an embodiment of an overlapping 14 and potential butting joints 16 and 18 to form an endless belt of FIGS. 1 and 2.

The fibers should be very rigid to provide a strong bond and have a much higher modulus than the belt material which typically has a Young's modulus of 300,000 to 1,500,000 psi. The fibers are sufficiently flexible to enable accurate placement in the seam area but of sufficient modulus to absorb the mechanical and thermal stresses without distortion of the seam area. The two ends of the belt material are joined by physically placing them together in overlapping and butting relationship with the fibers aligned parallel to the seam intact to preferably one of the overlapping surfaces although the fibers may be tacked to one of the butting surfaces. This may require the application of pressure to proper position the two mating portions. While the fibers may be placed between the overlapping portions of the belt ends as indicated by 20 in FIG. 2 may also be placed in either or both of the butting portions of the butting joints 16 and 18. In addition, while the fibers may be placed as a fiber per se they may also be placed in a laminate such as in a thermoplastic resin. In addition to the fibers being very rigid and providing a strong bond, a strong bond is provided by them remaining solid during the heating process to form the seam such as by ultrasonic heating or placed in an impulse welder. In this way, the belt material is at least softened if not melted and forms around the rigid strong fibers providing the strong bond between the belt material itself and the fibers. The fibers are placed in the seam area parallel to a seam and are initially stabilized and positioned by tacking the fibers down to the belt material with the use of a tacking iron. This prevents the fibers from moving from position during the seaming operation. Typically, the fibers extend across the length of the seam with a portion extending at each end to enable tension to be applied. The fibers are spaced across the seam as shown in FIGS. 2 and 3 at a density of 1 to 20 fibers per millimeter across the seam width. Fiber diameter is typically between 0.1 and 0.5 millimeters.

Once the fibers are in place they are tensioned along with the belt material by anchoring one end of the fibers and the belt material and pulling on the other end of the belt and the fibers with the same tension. While under tension the seam is formed by heating the seam area to a temperature sufficient to at least soften, if not melt, the belt material in the seam area. This may be accomplished with any conventional technique such as ultrasonic heating or impulse welding which heats the fibers and belt material to relieve the mechanical and thermal stresses in the belt material and tack the fibers, which act as a reinforcement, to the belt material. The number of impulses, length of the impulse and temperatures are dependent upon the materials selected. This tension applied is parallel to the seam and the fibers and while the belt material may be melted around the fibers it is important that the fibers themselves not soften, melt, or react with the belt material in order to maintain the rigidity and strength of the same. Of course, if the fibers themselves are in a thermoplastic matrix, the matrix may very well melt.

While not wishing to be bound to any theory of operation, it is believed that because of the built in stresses in the belt material formed during its manufacture, that when the seam is formed from the belt material and the rigid material put under tension as described above and heated such that the seam material is anchored to the fibers so it can't move that the fibers, it absorbs the stresses formed during the manufacture of the belt material and thereby relieve the stress in the belt material.

EXAMPLE

The following example further illustrates the present invention. A carbon filled polycarbonate belt substrate having a volume resistivity of $10^9$ ohm cm., about 0.003 inches in thickness having a modulus of about 300,000 psi and having a profile as illustrated in FIG. 2 formed by milling a strip about 0.0015 inches deep, one-half the thickness of the substrate and a width of about 0.200 inches and on the other end of the substrate a matching step profile was also formed by milling. Graphite fibers about 0.1 to 0.5 mm in thickness were placed on the lapping joint parallel to the joint and uniformly spaced across the seam at 1 to 2 fibers per millimeter. The fibers were stabilized by lightly tacking down to the polycarbonate substrate with the use of a tacking iron at a temperature of 300° F. The polycarbonate belt and graphite strips were pre-stressed in a direction parallel to the seam before and during seaming operation by taping an end of the fibers to the welding fixture and drawing them across the seam and held in place while the top part of the welder is moved into position. The seaming was accomplished with an impulse welder which delivered a single impulse for 0.1 to 0.2 seconds at 250° F.

Following fabrication, the belt may be finished by way of buffing or sanding and further, may have a suitable overcoating applied to control electrical properties, release properties, etc., which coating is typically of a thickness of 0.001 to 0.003 inch in thickness.

Thus, according to the present invention an endless flexible seamed belt is formed which is mechanically invisible and substantially equivalent in performance to a seamless belt. A principal advantage of the present invention is that while it uses overlapping seams and butting seams there is substantially no height differential between the seam and the portions of the belt adjacent to the seam area. Most importantly, the principal advantage of the present invention is that an endless seam belt is formed wherein there is no rippling of the seam or the belt material adjacent to the seam leading to copy quality defects in prints from automatic printing machines.

The patents cited herein are hereby incorporated by reference in their entirety in the instant application.

While the above invention has been described with reference to specific embodiments it is not intended to be limited thereto but rather those skilled in the art will recognize that variations and modifications may be made therein which are within the spirit of the scope and the appended claim.

It is claimed:

1. An endless flexible seamed belt formed by joining a top end and a bottom end of a material from which the belt is fabricated, said belt having at least one overlapping butting joint to form the belt seam of the endless flexible seamed belt, said top and bottom ends of the belt material shaped into overlapping mating portions of the same length and wherein both the top and bottom overlapping portions are about one-half the thickness of the belt material, said mating portions being joined to provide a lapping joint and two butting joints and wherein rigid, high strength fibers are present between mating portions of at least one joint, said seamed belt having been formed by the application of heat to said mating portions when said fibers are present in at least one joint.

2. The seamed belt of claim 1 wherein the seam joining the ends of the belt material has substantially the same thickness as the adjacent belt material.

3. The seamed belt of claim 1 wherein said fibers are present between the two mating portions forming the lapping joint.

4. The seamed belt of claim 1 wherein the top and bottom overlapping portions extend across the width of the belt.

5. The seamed belt of claim 1 wherein said fibers are graphite fibers.

6. The seamed belt of claim 1 wherein the seam and adjacent belt surfaces are smooth and free of rippling.

7. The seamed belt of claim 1 wherein the rigid high strength fibers are oriented parallel to the belt seam.

8. The seamed belt of claim 1 wherein the belt material in the seam and the fibers are under tension during the application of the heat.

9. The seamed belt of claim 1 wherein there is substantially no height differential between the seam and the adjacent belt material.

10. The seamed belt of claim 1 wherein the belt material is melted around the fibers.

11. The seamed belt of claim 1 wherein the belt material is selected from the group consisting of a thermoplastic material and a thermosetting material.

12. The seamed belt of claim 11 wherein the belt material is a thermoplastic polycarbonate.

13. An endless flexible seamed belt formed by joining a top end and a bottom end of a material from which the belt is fabricated, said belt having at least one overlapping butting joint to form the endless belt, said top and bottom ends of the belt material shaped into overlapping mating portions of the same length and wherein both the top and bottom overlapping portions are about one-half the thickness of the belt material, said mating portions being joined to provide a lapping joint and two butting joints and wherein rigid, high strength fibers having a modulus much higher than that of the belt material, are present between mating portions of at least one joint, said seamed belt having been formed by the application of heat to said mating portions when said fibers are present in at least one joint.

14. The seamed belt of claim 13, wherein said rigid, high strength fibers are comprised of a material selected from the group consisting of graphite, glass and nylon.

* * * * *